United States Patent [19]

Schenkel et al.

[11] 3,859,465

[45] Jan. 7, 1975

[54] DATA TRANSMISSION SYSTEM WITH MULTIPLE ACCESS FOR THE CONNECTED USERS

[75] Inventors: Klaus Dieter Schenkel, Senden; Rudolf Schehrer, Geislingen/Steige, both of Germany

[73] Assignee: Licentia Patent-Verwaltungs G.m.b.H., Frankfurt am Main, Germany

[22] Filed: Feb. 23, 1973

[21] Appl. No.: 335,180

[30] Foreign Application Priority Data

Feb. 23, 1972 Germany .......................... 2208396

[52] U.S. Cl. .......................................... 179/15 AL

[51] Int. Cl. .......................................... H04j 3/08

[58] Field of Search ........ 179/15 AL, 15 BD; 325/4; 340/172.5

[56] References Cited

UNITED STATES PATENTS

| | | | |
|---|---|---|---|
| 3,597,549 | 8/1971 | Farmer | 179/15 AL |
| 3,710,026 | 1/1973 | Graham et al. | 179/15 AL |
| 3,732,543 | 5/1973 | Rocher | 179/15 AL |
| 3,742,144 | 6/1973 | Brandenburg | 179/15 AL |

*Primary Examiner*—Ralph D. Blakeslee
*Attorney, Agent, or Firm*—Spencer & Kaye

[57] ABSTRACT

In a communication network having a plurality of branches with associated user stations, a data transmission system is utilized in which interconnections are provided by a time-division multiplex multiple access method between the user stations, each station being connected in a branch and the branches being interconnected through a plurality of nodes. Each branch includes a transmission line and a receiving line, which are connected at one point in the network. A synchronizing word generator, which is centrally located within the network, supplies synchronizing words to the system. At each of the user stations, the interval between successive synchronizing words is divided into n equal time slots. When a user station desired to establish a connection with the system, the user transmits a test block signal into a free time slot. If this test block signal simultaneously arrives at a node simultaneously with a signal from another station, the test block from the user is shifted into a subsequent unoccupied time slot and then transmits its data in that subsequent slot during each successive interval.

11 Claims, 7 Drawing Figures

DATA TRANSMISSION SYSTEM WITH MULTIPLE ACCESS FOR THE CONNECTED USERS

BACKGROUND OF THE INVENTION

The present invention relates to a data transmission system for a communication network having a plurality of branches to each of which individual user stations are connected, and particularly to a system utilizing a time-division multiplex method with multiple access for the user stations. The branches are interconnected at a plurality of nodes to establish an interconnected network.

Each of the branches has a transmission line and a receiving line which are each respectively connected with the corresponding lines in the other branches via the nodes. At one point in the system, the transmission line and the receiving line are connected directly together so that data is transferred from one to the other. A transmission line, therefore, can be defined as a line which carries data between a station and a node or between nodes in a direction towards this point of interconnection between the lines, and the receiving line are those which carry the data in a direction away from this point. The nodes are often referred to as being of a higher order as they become closer to the point of connection between the lines.

A synchronizing word generator, for example a clock pulse generator, is connected within the communication network at an arbitrary point which is preferably centrally located within the network. This generator periodically provides a synchronizing word to the transmission lines which is then transmitted throughout the entire system. Each of the user stations receives the transmitted synchronizing words and divides the interval between successive synchronizing words into n equal time slots, and each interval defines a time frame.

The U.S. Patent application Ser. No. 334,757, to Schenkel, Schehrer, Herzig and Hildenbrand, filed on Feb. 22, 1973, discloses a data transmission system employing a time-division multiplex method with multiple access for the connected users. In this system, a sync word is periodically emitted from an arbitrary point of the communications network so that each user can divide the interval between two successive sync words into n equal time slots and transmit the information intended for another user together with that user's address during a free time slot. A system of this type is disclosed in United States application Ser. No. 220,009 filed by Horst Ohnsorge and Manfred Borner on Jan. 24, 1972, and entitled DATA TRANSMISSION SYSTEM.

This type of time-division multiplex method is extremely flexible. Independent of traffic flow within the network and data shifts which might possibly be produced between the various time channels, each user can readily obtain the information specifically intended for him by utilizing the preceding station address which is transmitted with the information.

One drawback of this method, however, is that the nodes of the network must be provided with memories whose size, or capacity, depends on the maximum traffic density and with the aid of which the blocks of data arriving from the various directions are stacked in outgoing directions in accordance with an interlacing method. This is done in such a way that in the case of simultaneously arriving data blocks in a node one of these blocks is switched to the outgoing line immediately and the other data block(s) are stored in the memory. Each stored data block is transmitted on the outgoing line in a free time slot, i.e. a time slot which is not occupied on any incoming line to this node. A spillover in these network node memories causes a loss of information. Furthermore, the transmission capacity of the communications system is reduced since each data block to be transmitted must have a station address preceding it.

SUMMARY OF THE INVENTION

An object of the present invention is to provide a time-division multiplex multiple access system in which the above drawbacks are eliminated.

Another object of the present invention is to provide a time-division multiplex system with multiple access for the individual users and a completely decentralized association of the individual time slots with respect to the data to be transmitted in which the capacity of the time frame is fully utilized for the transmission of data and the station address is unmistakably given for the duration of the transmission by the time information, such as, for example, by the time slot number.

These objectives are accomplished according to the present invention in that a test block signal is transmitted by the calling user station within a free time slot in order to assist in establishing a connection of the user station with the system. When this transmitted test block encounters an occupied time slot arriving from another branch within a network node, the test block is delayed until a free time slot appears. The user who has transmitted the test block will note this delay caused by the waiting times when he receives his own test block back and will then continue further transmission within a time slot which is delayed with respect to the original time slot by the total amount of the waiting times from the delays at all of the nodes. Once this time slot for transmission of data has been derived, the user station is considered to be connected within the system.

The present invention advantageously permits a substantial reduction in expenditures due to the elimination of excess equipment, particularly for the nodes. This will be explained in detail for various embodiments which are illustrated in the drawings.

DESCRIPTION OF THE PREFERRED EMBODIMENTS

Figures 1, 5:
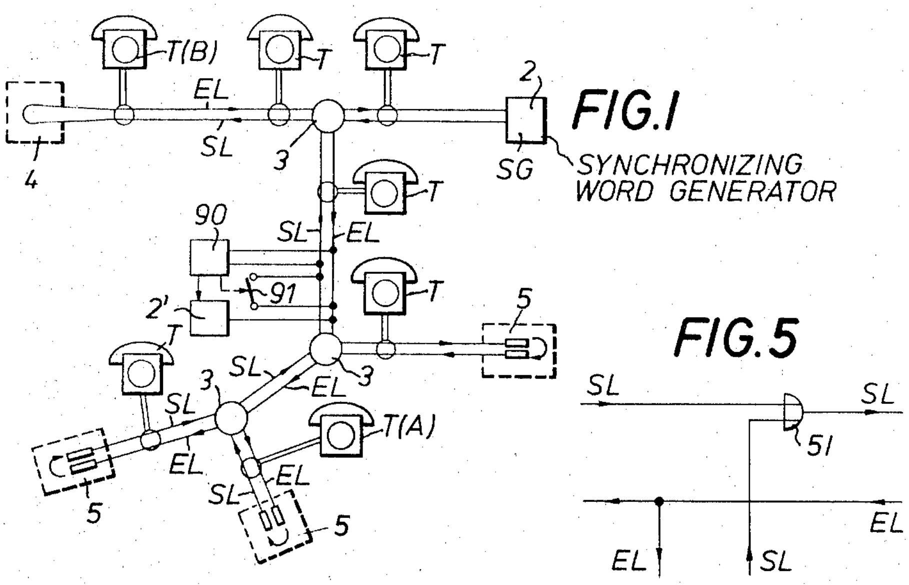
FIG. 1 is a block circuit diagram of a multiple-branch communication network, in accordance with the present invention, having a plurality of connected user stations, with separate transmitting and receiving lines in each of the branches.
FIG. 5 is a block circuit diagram of one of the nodes of a network in which all of the sync words in the branches have been synchronized with respect to the time frames and in which two incidentally simultaneously arriving test block signals are superimposed.

FIG. 1 shows a communication network configuration which is particularly suited for the data transmission system according to the present invention. This network includes a plurality of branches but does not include any closed links, or loops. Each branch of this network consists of a double line SL (transmitting line) and EL (receiving line), each of which carries a unidirectional data transmission in a respectively opposite direction.

The transmission line is directly connected to the receiving line at only one point 4 in the network, which point is preferably at the end of one of the branches. At this point of connection the information being transmitted within the transmission line is transferred to the receiving line. The nodes are considered to be in an ascending order as they are disposed closer to the connector 4. The transmission lines, therefore, carry information from each node to a next higher order node, i.e. in a direction toward the connector 4. The receiving lines, on the other hand, carry information from a node to the next lower order node.

A plurality of user stations T are connected to the various branches; these user stations can include not only telephone systems, but also, for example, telex machines, computers, visual modules and other communication systems. A synchronizing word generator, SG, 2, which can be, for example, a clock pulse generator, is connected within the network at a point which is preferably centrally located. Furthermore a stand-by sync word generator 2, control unit 90 and switch 91 may be provided at a node to avoid malfunctions.

At the ends of each of the lines of the network there are reflection free sinks 5; the sync words arriving from a sync word generator SG, however, are transferred from the transmission line to the receiving line at these points. Each data block and the sync word arriving on the transmission line are compared with respect to the sync word pattern in a correlation receiver. Thus the sync word is detected and switched through to the receiving line whereas all other blocks are disconnected from the receiving line. All but one of the sync words arriving at a node 3 from the various transmitting lines are suppressed in the line emanating from the node. This is done by means of correlation receivers assigned to all incoming lines but one. These correlation receivers detect the incoming sync words and cause a disconnection of the incoming and the outgoing lines during the time slots containing the sync words.

Every user T, which may be connected to any desired point of the network, transmits its data on line SL leading to the next higher node 3 and receives the data intended for it on the second line EL coming from the next higher node. In the normal state of the system, i.e. when no connection is being established at the moment, all existing connections occupy only those time slots which permit their interlacing in the nodes without any need for intermediate storage.

When a new connection is to be established, it is only necessary to ensure that only such free time slots are selected which do not encounter an occupied time slot at any of the nodes in the network. In order to facilitate the determination of whether or not a time slot is occupied, each transmitted block is provided with a time slot occupation signal. This may advisably be realized, for example, in that each block begins with a binary 1.

Any one of the users, e.g. user T(A), finds a free time slot in the following manner:

After user T(A) has taken off the receiver, its instrument initially transmits test block signals within any desired free time slot with an address assigned to itself, i.e. the signal is addressed to T(A). The test block contains a test slot occupation signal and at least one data identification signal. This latter signal serves to distinguish a test block from a normal data block. The data identification signal may be, for example, the second bit of the block. Instead of there being any other data bits within the test blocks, however, there can be, for example, nothing but zeroes.

Such a test block signal will generally not be switched through without delay at all of the nodes. If at some node a test block signal encounters a data block signal from an already existing connection, then continuation of the transmission of the test block signal is effected in that the test block signal is stored at the node, the subsequent data block signals, however, will not be stored. As soon as a free time slot appears at the node, the test block signal is released and transmission of the test block signal is continued at this point. This process may be repeated at several nodes for one test block signal. At the time when the test block signal (together with other blocks) is finally transferred into the receiving line through the connector 4, it will take up one of the previously unoccupied time slots.

Even if a test block is not delayed in any of the nodes, it will still appear, in the receiving line of user T(A), in a time slot which, with respect to the associated sync word, is different from that in which it was inserted in the transmitting line. The distance of the test block from the sync word will thus have been shifted by a number $i$ of time slots. This shift by $i$ time slots is caused since the sync words in the individual transmitting line sections are offset with respect to one another. The number $i$ is preset within the user instruments by a one time travel time measurement when the system is installed. This delay of $i$ time slots is the same for all of the users connected to the same branch, which all utilize the same reflected sync word in the transmitting line. Thus, upon emission of the test block signal, the instrument of user T(A) expects the signal back in the receiving line with a delay of $i$ slots.

If a test block signal is delayed at one or a plurality of nodes, it arrives in the receiving line with a delay of a total of $k$ slots with respect to the time slot at which it was expected. The instrument of user T(A) determines this deviation $k$ and now transmits its test blocks in the transmitting line with a delay of $k$ slots with respect to the previously transmitted test blocks.

It may happen, however, that this new time slot is occupied by a sync word in one of the transmitting lines used by the test blocks. For this reason a further test block signal is initially transmitted in this new time slot. If a further delay is necessary this is effected again in the same manner as described above. When a test block signal arrives in the receiving line without delay ($k=0$), a free time slot has been found and connection within the system has been completely established.

It may happen however, although it is relatively rare, that two users who wish to establish a new connection will search for a free time slot within a very short time interval, which is short with respect to the frame duration. It may then happen, that while one of the test block signals would have to wait at one of the nodes, the memory is already occupied by the other test block signal. Consequently, the later arriving test block signal is lost.

This loss of a test block signal will occur only with a very slight probability and it is not considered to be that annoying when it does. When such a loss does occur, then that one of the series of test block signals is simply suppressed which signifies an extension of the duration of one frame in the time taken to establish a connection. This is a significant advantage of the data transmission system of the present invention. No malfunction occurs within the system when the memory spills over and no information is falsified, the only thing that happens is that the time for establishing the connection is extended which usually is not at all noticeable.

A further advantage of this embodiment is that the system can be used very heavily without malfunctions occurring from such heavy use. Furthermore, there exists the particular advantage that even when the system is very heavily utilized only a single memory with the storage capacity for the contents of only a single time slot is required at each node.

Figure 2:
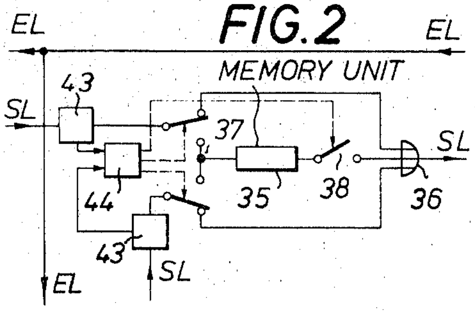
FIG. 2 is a block circuit diagram of one of the nodes of the communication network of FIG. 1 having a single memory unit for storing the contents of one time slot, two buffer stores and a control unit.

An example for the design of a node is shown in FIG. 2 with the transmitting line SL, the receiving line EL, the memory unit 35, switch 38, pair of switches 37, an OR member 36, buffer stores 43 and control unit 44. The block signals arriving on transmitting lines SL are fed into buffer stores 43. A control 44 compares the contents of the buffer stores. Depending on the result of this comparison (both buffers empty, one buffer empty or one buffer occupied by a data block and the other buffer occupied by a test block) different read-in signals, read-out signals and switching signals are fed to memory unit 35 and switches 37 and 38. The control unit 44 switches the pair of switches 37, when a data block signal arrives through the transmitting line from one direction at the same time as a test block signal arrives from the other direction, so that the data block signal is directly switched to the OR member 36 while the test block signal is written into memory 35, which need only be capable of storing one such signal. At the same time the control units control the discharge from memory 35 via switch 38 so that the contents of memory 35 (one test block signal) is read out whenever a free time slot is available in the outgoing transmitting line via OR circuit 36.

The control circuit may be, for example, a comparison circuit which determines whether two time slots simultaneously arriving from two different directions are both occupied. If both time slots are free, the memory is read out. If only one time slot from one direction is occupied, the direction from which the occupied time slot comes is directly switched through to the outgoing transmitting line. If the time slots in both incoming transmitting lines are occupied, one direction is switched through and the information of the other time slot is stored in memory 35.

In another embodiment of the present invention the user instrument first searches for a free time slot in the receiving line. Since the time slot delay between the sync word in its transmitting line and the sync word in its receiving line is known for the user instrument, it is also known which time slot in the transmitting line corresponds to the free time slot found in the receiving line. This time slot in the transmitting line which in other parts of the network can only be occupied by either a sync word or another test block signal, is now used to transmit the test block signal. These test block signals must be stored in the nodes only when they coincide with sync words or with another test block signal. It is not possible for these test block signals to coincide with blocks of completely established conversations since the test block signals are transmitted only in such time slots which are not occupied by an established connection. In this embodiment it, therefore, is possible to more easily and rapidly interlace the test blocks, which is of advantage in many cases.

In a further embodiment of the present invention the memories in the network nodes each include an adding mechanism. If a test block signal is present in the memory unit, a 1 is added to the information portion of the test block for each delay encountered by having to wait for another time slot. When the user receives back his test block signal, the number $k$ of the delayed time slots is thus present in the information portion. It, therefore, is not necessary in this case for the number $i$ to be known as a measure of the shift of a test block signal which has not been delayed in the network nodes. The delay $k$ can be found directly in the information portion of the test block. This signifies a simplification and reduction in cost for the numerous user instruments.

Figure 3:
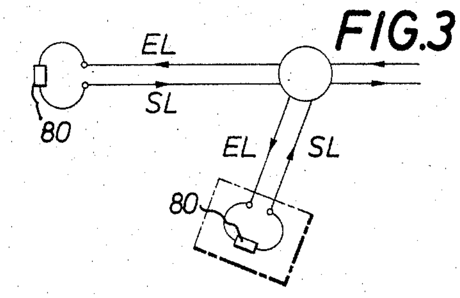
FIG. 3 is a block circuit diagram showing two of the branches of the network of FIG. 1 with a delay device which reflects the sync word at the end of the lines of each of the branches, for the purpose of synchronizing the sync words in all of the branches.
Figure 4:
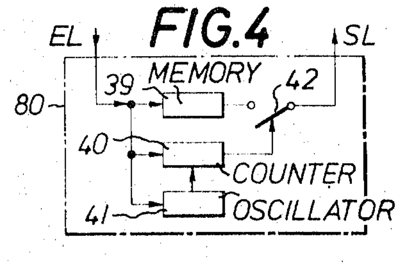
FIG. 4 is a block circuit diagram of the delay device shown in FIG. 3.

FIG. 3 shows an advantageous further embodiment of the present invention in which at the ends of the lines where the sync word reflection takes place the sync word is not directly transferred from the receiving line to the transmitting line but rather via a delay device 80. FIG. 4 shows the particular construction of such a delay device 80. The sync word upon arriving at the device 80 is stored within the memory 39. A counter 40 counts the bit signals from oscillator 41 and provides an output signal when the count equals the preselected desired delay. The output signal of the counter actuates switch 42 so as to release the sync word from memory 39.

The delay period of the sync word by the delay member 80 is such that the sync words in the transmitting lines simultaneously arrive at the nodes, i.e. the sync words are now synchronized. Thus the entire network is also synchronized with respect to the time frames. A block transmitted through a transmitting line will have the same position with respect to the sync word in all occupied sections of the transmitting line and also in the receiving line since the sync words are not offset with respect to one another in the individual lines.

FIG. 5 shows a network node for this embodiment of the present invention in which all of the sync words have been synchronized. These nodes no longer require any memories which is an advantage when expenditures are considered.

A free time slot is now found in the following manner.

The user instrument selects a free time slot in the receiving line and transmits a test block signal in the corresponding time slot in the transmitting line. Test blocks are thus transmitted only in such time slots which are not used by an established connection anywhere in the network so that the test block signal can only encounter another test block signal at the nodes. If a test block signal does not encounter another test block signal at any of the nodes, then a free, i.e. unoccupied time slot has been found. The test block signal is now replaced by a data block signal, which is fed into the transmitting line and can be received by the appropriate user.

If it should happen by accident that two test block signals arrive at one node from different directions in the same time slot, then continued transmission of both test block signals is prevented. Both of these test block signals are falsified by superposition in OR circuit 51. Each one of the calling users upon determining that the transmission of the test block signal was interrupted must then transmit a new test block signal in another free time slot which is delayed with respect to the originally selected time slot. This process will continue until an unoccupied time slot is found and connection of the user to the system is established.

Figure 6:
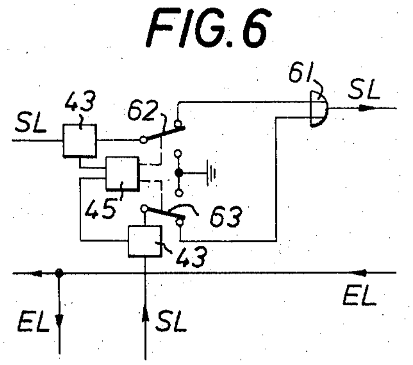
FIG. 6 is a block circuit diagram of a node with a device for suppressing one of two incidentally simultaneously arriving test block signals.

This superposition can be avoided only if one of two simultaneously arriving test blocks is transmitted on and the other is suppressed. FIG. 6 shows a network node which transmits via the OR circuit 61 only one of two simultaneously arriving test blocks. This requires two switches, 62 and 63, which can be controlled in any one of several suitable ways by a control mechanism. For example, if the test blocks arriving over the line connected to switch 62 are to have priority, switch 62 is maintained permanently closed and when test blocks arrive simultaneously at both buffers 43, control unit 45 opens switch 63. Unit 45 can also be arranged to control the state of switch 62 if the signals arriving over the line 63 are to have priority. The advantage of this method is that the user whose test block was transmitted on can continue to establish his connection. The other user whose test block was suppressed looks for a new time slot and transmits another test block signal in this new time slot. The control unit 45 can also operate in the following manner, for example: If both buffers 43 are occupied a switch signal is generated in the control unit 45 and each successive switch signal is fed alternately or randomly either to switch 62 or 63 to disconnect the respective buffer from OR gate 61. Control unit 46 corresponding to FIG. 7 generates a switch signal in the same manner as control unit 45. This switch signal is fed to switch 72 to disconnect buffer 43 from OR gate 71 in the case when both buffers are occupied.

Figure 7:
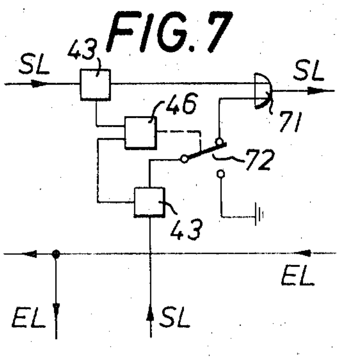
FIG. 7 is a block circuit diagram of a modified embodiment of the node shown in FIG. 6 with selective suppression of one of the incidentally simultaneously arriving test block signals.

For reasons of circuit simplification it is advisable in the case where two test block signals arrive simultaneously at the nodes, to always suppress the signals coming in on the same line. FIG. 7 shows an embodiment of such a node. If only one test block signal appears in the incoming transmitting lines, this signal is transmitted to the outgoing transmitting line via the OR circuit, 71. If, however, two test block signals simultaneously arrive at the node the switch, 72, is switched in such a way that only one test block continues on and the other test block is suppressed. The coincidence of two test block signals in one node does not result in a loss of information but only in a slight delay of the time required to establish a connection.

While it happens in systems without frame synchronization that the users cannot utilize certain time slots in some sections of the lines since they are occupied by sync words in other parts of the transmitting lines, this restriction is eliminated in the embodiments of the present invention utilizing frame synchronization. Except for the one time slot occupied by the sync word, every other time slot can be used by every user.

The frame synchronization provides similar advantages to this system as those offered by a data transmission system consisting of a single unbranched line. It is also further advantageous that only a single block (i.e. the sync word), instead of a more or less large portion of a frame, is delayed in the delay devices at the ends of the lines which provide for the frame synchronization. The necessary delay period is advantageously carried out by controlling the readout of a memory into which the sync word is written after the expiration of the fixed delay time (FIG. 4). When a completely unoccupied time slot is finally found so that the data signals to be transmitted can be sent over the entire communications network without any need for intermediate storage, the connection with the system is considered to be established and the actual process of contacting another user station can begin.

The calling user's instrument T(A) transmits to the called user T(B) (see FIG. 1) the call combination (B,A). Once T(B) receives this call, he occupies, in the same manner as used by user T(A), a free time slot suitable for the transmission and acknowledges the call by the address combination (A,B). This acknowledgement actuates a dial tone signal within user T(A)'s instrument. Now, T(A) transmits a signal (B,B) to actuate the ringing device at user T(B). Once user T(B) lifts his receiver, a combination of address and data (A address, data block) is transmitted. The instrument of user A then terminates the dial tone and transmits his combination of address and data (B address data block). The connection between the user stations is then considered to be established.

In a further embodiment of the present invention the address head is no longer transmitted during the actual transmission of data, i.e. once the connection has been established and the calling and acknowledgement routine has been completed, but rather only information is transmitted during the entire time slot. This elimination is possible since due to the complete frame synchronization within the system, once a connection between the users is established each user knows in exactly what time slot to expect the data being sent to it. The transmitted blocks, however, must still contain the time slot occupation signal and the data identification signal. In this embodiment of the present invention it is possible to completely utilize the channel capacity of the communications network for the transmission of information.

There also exists the possibility to detect the occupied state of a user in that a user already participating in a transmission of data emits a busy signal when he receives a further call. Another possibility, which is of equal benefit in a network to be operated substantially without interference, is to not emit an acknowledgement at all to such a second call. The calling user instrument will recognize through the receiving line that while its call was transmitted it has not received an acknowledgement and, consequently, will automatically switch to the "busy signal" after a given tolerance period and interrupt the call. Each node contains a control unit 91 connected to the two transmission lines EL and SL leading to the node of next higher order. Furthermore a switch 91 between lines EL and SL and a sync word generator 2' connected to line EL is inserted. In case of a malfunction of the sync generator 2 or interruption of lines EL and SL somewhere control unit 90 receives only a sync word from SL or no sync word at all. If a sync word is only received from SL the switch 91 gets a switching signal from the control unit and if no sync word is received neither from SL nor EL the control unit feeds a switching signal to switch 91 and an activating signal to the sync generator 2'.

It will be understood that the above description of the present invention is susceptible to various modifications, changes and adaptations, and the same are intended to be comprehended within the meaning and range of equivalents of the appended claims.

We claim:

1. In a time-division multiplex multiple access (TDMA) data transmission system connected in a communication network having a plurality of branches and including: a plurality of nodes interconnecting the plurality of branches so as to form an interconnecting system of all of the individual user stations, each of the branches having first and second transmission lines; connecting means directly connecting the first and second transmission lines at one point in the system so as to enable data to be transferred from one line to the other; the first transmission line constituting a transmitting line for transmitting data to a next succeeding node in a direction towards the point at which the first and second lines are connected, and the second transmission line constituting a receiving line for carrying data from the respective succeeding node in a direction away from the point of connection of the first and second transmission lines; and generating means connected in the system for periodically transmitting synchronizing words; each user station being arranged to divide the interval between successive synchronizing words into *n* equal time slots; the improvement wherein said system comprises: transmitting means connected within each of the user stations for transmitting a test block signal over said transmitting line in a presently free time slot, of the *n* time slots, in order to establish connection with another user in the system; priority means connected within each of said nodes for delaying the time of transmission of the test block signal when such signal arrives at its respective node simultaneously with a signal from another user; monitoring means connected within each of said user stations for monitoring the signal flow on said receiving line and for determining if the transmission of the test block transmitted by it has been delayed; control means within each of said user stations, connected to said monitoring means, for transmitting a further test block within a time interval delayed with respect to the interval in which the previous test block signal was transmitted when it is determined that the transmision of the previously transmitted test block signal has been delayed until the transmission of a transmitted test block signal returns to the associated user station without any delay in its transmission, thus indicating an unoccupied time slot has been found; and data delivery means within each said user station for transmitting additional data within such a delayed unoccupied time slot during each successive interval after a test block returns to said user station without any such delay in its transmission.

2. A data transmission system as defined in claim 1 wherein said priority means comprises memory means for temporarily storing a test block signal until a free time slot has been found, thereby delaying the transmission of the test block signal with respect to its original time slot; and said control means transmits a further test block signal within a time slot determined by the total time delay caused by the delay periods at all of the nodes traversed by the previously transmitted test block signal.

3. A data transmission system as defined in claim 2 wherein each test block signal contains an information portion in which the waiting periods experienced by the test block signal in all of the individual nodes of the network are summed and stored and said memory means further includes means for adding the number of waiting periods by which the test block signal has been delayed to the contents of its information portion.

4. A data transmission system as defined in claim 3 further comprising address means connected within each of said user stations for producing an address signal representing the address of a user station being called which is only transmitted by the respective calling user station until it has been connected with the called user station, after which connection only data is transmitted by the respective calling user station.

5. A data transmission system as defined in claim 4 wherein each transmitted block signal contains a time slot occupation signal and a data identification signal.

6. A data transmission system as defined in claim 1 further comprising: transfer means, connected at the end of each of the branches, except the branch containing the point at which said transmission line and said receiving line are directly connected, for transferring the synchronizing words from said receiving line to said transmitting line, said transfer means including means for delaying the synchronizing words being transferred between said lines by a selected time period for causing the synchronizing word to arrive at each said node from all of its connected branches in the same time slot, thereby eliminating the need for memories in said nodes.

7. A data transmission system as defined in claim 6 wherein said means for delaying the synchronizing words includes a memory for temporarily storing the synchronizing words, and a counter for counting the time slot delay.

8. A data transmission system as defined in claim 7 wherein said priority means superimposes the test block signals when two such signals simultaneously arrive at a said node, thereby preventing either of the test block signals from being transmitted on.

9. A data transmission system as defined in claim 7 wherein said priority means suppresses one of the test block signals when two test block signals simultaneously arrive at a said node, thereby preventing the suppressed test block signal from being transmitted on.

10. A data transmission system as defined in claim 9 further comprising: means for providing a transfer between said transmission line and said receiving line when transmission has been interrupted by a malfunction, such transfer being effected at the node nearest the point of malfunction.

11. A data transmission system as defined in claim 9 further comprising: additional synchronizing word generator means connected within the network for automatically providing synchronizing words when a malfunction occurs in said generating means.

* * * * *